United States Patent [19]

Peterman

[11] Patent Number: 4,616,889
[45] Date of Patent: Oct. 14, 1986

[54] ANTI-ROLL BRAKE FOR MOBILE STORAGE SYSTEM

[75] Inventor: Robert J. Peterman, Hartland, Wis.
[73] Assignee: Spacesaver Corporation, Fort Atkinson, Wis.
[21] Appl. No.: 650,270
[22] Filed: Sep. 14, 1984
[51] Int. Cl.[4] .............................................. A47B 87/00
[52] U.S. Cl. ........................................ 312/201; 188/83
[58] Field of Search .............................. 312/198–201; 188/83; 403/26

[56] References Cited

U.S. PATENT DOCUMENTS

| | | | |
|---|---|---|---|
| 1,158,844 | 11/1915 | Price | 403/26 |
| 1,594,757 | 8/1926 | Ritter | 188/83 |
| 2,997,136 | 8/1961 | Gaines et al. | 188/83 |
| 3,144,919 | 8/1984 | Foote | 188/83 |
| 3,381,798 | 5/1968 | Kornylak | 188/83 |
| 4,138,173 | 2/1979 | Taniwaki | 312/200 |
| 4,523,794 | 6/1985 | Peterman | 312/201 |

Primary Examiner—William E. Lyddane
Assistant Examiner—Joseph Falk
Attorney, Agent, or Firm—Fuller, House & Hohenfeldt

[57] ABSTRACT

A mobile storage system includes an anti-roll safety brake for preventing undesired rolling of a movable carriage. The anti-roll brake is engaged continuously so that a portion of the power required to move a carriage is expended in overcoming the friction force of the brake. Upon removal of the power source, such as de-energizing an electric drive motor, the anti-roll brake prevents all unpowered rolling of the carriage, and it continues to hold the carriage in place until the drive motor is again energized. The anti-roll brake is particularly useful in mobile storage systems in which the guide rails cannot be installed in a level attitude.

4 Claims, 4 Drawing Figures

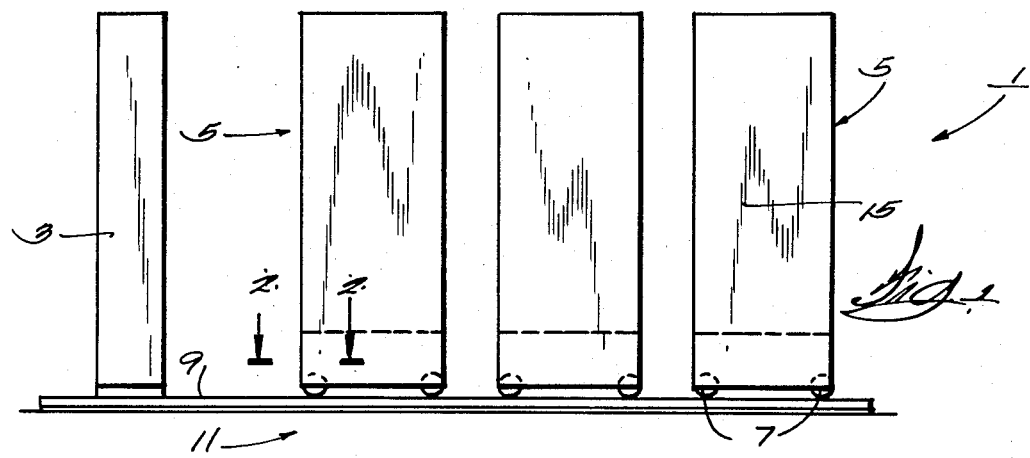
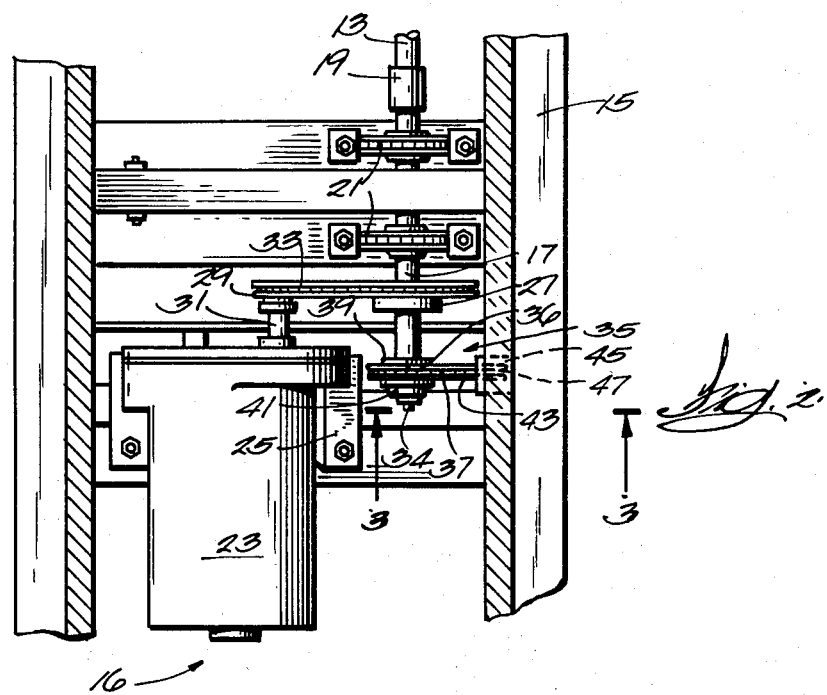

ANTI-ROLL BRAKE FOR MOBILE STORAGE SYSTEM

BACKGROUND OF THE INVENTION

1. Field of the Invention

This invention pertains to safety apparatus, and more particularly to apparatus for preventing a movable carriage from rolling down an inclined surface.

2. Description of the Prior Art

Mobile storage systems for storing books and files in libraries and offices are well known. The systems include at least one elongated and wheeled bookshelf-like carriage which rolls along rails embedded in the building floor. The carriage may be moved along the rail either manually or under electric power.

Under certain circumstances, the system rails cannot be installed in the floor in a level attitude. In that situation, it is nececcary to automatically lock a power movable carriage in place immediately upon de-energizing the drive motor so as to prevent uncontrolled rolling and possible injury to a person in its path. Further, the carriage must remain locked against rolling until the driving force is reapplied.

To lock a carriage in place, various devices have been developed. For example, U.S. patent application Ser. No. 575,216 illustrates a rack and spring loaded locking Bar. U.S. Pat. No. 4,523,794 discloses a reciprocable pin type locking device. However, the devices of the two mentioned patent applications are designed for locking manually operated and level carriages which are stationary prior to engaging the respective locks. They are not intended to stop a carriage which is rolling without control after the driving force has been removed.

A need exists for a safety brake which is applied immediately upon stopping a movable carriage and which remains applied until the carriage is restarted.

SUMMARY OF THE INVENTION

In accordance with the present invention, an anti-roll safety brake is provided which automatically prevents rolling of a movable storage carriage at all times when the source of moving power is not applied. This is accomplished by the apparatus which continuously retards carriage movement.

In the preferred embodiment, the anti-roll brake produces a frictional drag on the carriage wheels. When the carriage is in motion, the power source, which may be applied manually or by an electric motor, must overcome the frictional resistance of the brake. In both applications, the anti-roll brake holds the carriage at the desired location without undesirable rolling, even if the carriage rails are not level, when the power source is removed. The anti-roll brake maintains its carriage holding ability throughout the time the power source is not applied. Thus, the carriage remains stationary against undesirable rolling up to the instant the motor, for example, is reenergized for controllably moving the carriage in the desired direction.

The anti-roll brake of the present invention may be constructed as a shoe and drum type brake or as a caliper brake for gripping opposite sides of the rails. Preferably, the anti-roll brake is constructed as a stationary plate interposed between two friction discs which are mounted for rotation with a carriage axle. The plate may be a sprocket held against rotation by a chain wrapped around the sprocket and fixed to the carriage frame. A variable axial force is applied to the sprocket and friction discs by means of an adjusting device, such as a nut threaded onto the axle. Thus, a frictional force is developed between the friction discs and sprocket whenever the carriage tends to roll, and the frictional force may be varied to suit different size drive motors and different degrees of rail slope.

Other objects and advantages of the invention will become apparent to those skilled in the art from the disclosure.

BRIEF DESCRIPTION OF THE DRAWINGS

FIG. 1 is a side view of a mobile storage system which adventageously employs the anti-roll safety brake of the present invention;

FIG. 2 is a sectional view taken along line 2—2 of FIG. 1;

FIG. 3 is a sectional view taken along lines 3—3 of FIG. 2; and

DETAILED DESCRIPTION OF THE INVENTION

Figure 4:
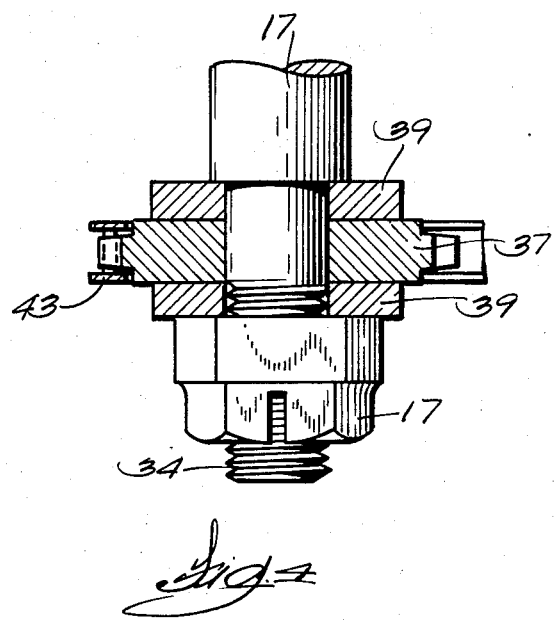
FIG. 4 is a sectional view taken along lines 4—4 of FIG. 3.

Although the disclosure hereof is detailed and exact to enable those skilled in the art to practice the invention, the physical emobodiments herein disclosed merely exemplify the invention which may be embodied in other specific structure. The scope of the invention is defined in the claims appended hereto.

Referring to FIG. 1, a mobile storage system 1 is illustrated which includes the present invention. The mobile storage system finds particular usefulness for storing books and files in libraries and offices, but it will be understood that the invention is not limited to storage applications.

The mobile storage system 1 typically includes a fixed bookcase-like storage shelf 3 and several movable carriages 5. To permit easy movement of the carriages 5 under either manually or electric power, they are equipped with wheels 7 which roll along two or more parallel guide rails 9. The rails 9 are firmly embedded in the floor 11 of the office or library. The wheels are mounted on axles 13 which are journaled in the carriage frame 15 in a well-known manner. See FIG. 2.

To transmit power for rolling the carriages 5 along the rails 9, each carriage includes at least one drive mechanism. In the illustrated construction, the drive mechanism 16 includes a shaft 17 coupled to an axle 13 by a coupling 19 and journaled for rotation with the axle within the frame 15 by conventional bearings 21. The source of power may be an electric motor 23 mounted to the frame by an appropriate housing 25. To transmit the motor torque to the shaft 17, any suitable transmission device may be used. In FIG. 2, the transmission is a chain and sprocket arrangement comprising a first sprocket 27 rigidly secured to the shaft 17, a second sprocket 29 rigidly secured to the armature shaft 31 of the motor, and a chain 33 trained over the two sprockets. Thus, energizing the motor causes rotation of shaft 17, axle 13, and wheels 7, resulting in corresponding movement of the carriage 5.

In accordance with the present invention, each carriage 5 is provided with an anti-roll safety brake for automatically and securely holding the carriage against rolling at all times the drive motor 23 is de-energized. Automatic and secure holding is especially important in situations where the rails 9 are not perfectly level. In that situation it is necessary that the anti-roll brake be engaged instantly upon de-energization of the motor and that it hold the carriage until the motor is re-energized.

Referring to FIGS. 2 and 3, the anti-roll brake of the present invention is designated by reference numeral 35, and it includes a plate-like member stationarily fastened to the frame 15. In the illustrated construction, the plate-like member is formed as a sprocket 37 having a central apperture therethrough adapted to fit over a turned down end 34 of the shaft 17. The turned down end 34 terminates at shoulder 36. The sprocket 37 is not fastened to the shaft 17 for rotation therewith. Disposed on each side of the sprocket is a friction disc 39. Each friction disc is keyed or otherwise firmly fastened to the shaft for rotation herewith. The friction discs and sprocket are retained on the shaft by a castle nut 41 threaded onto the shaft end 34. A conventional cotter pin, not illustrated, may be used to retain the castle nut in the desired location on the shaft end 34. It will be appreciated that rotating nut 41 produces adjustable amounts of axial force on the friction discs and sprocket as they are squeezed between the nut and shoulder 36.

To restrain the sprocket 37 against rotation with the shaft 17, a chain 43 is wrapped around the sprocket, and the chain ends are anchored to the carriage frame 15. One end 44 of the chain 43 may be fixed to the frame by means of a block 45 in conjunction with a conventional fastener 47. The second end of the chain is ajustably fastened to the frame, as for example, by a turn buckle. As illustrated in FIG. 3, chain end 46 is adjustably fastened by a link 49 and a stud 51 secured thereto and passing through an opening in the frame panel 52. A nut 53 and washer 55 are threaded onto the stud 51 with the frame panel 52 sandwiched between the two washers.

In operation, the nut 41 is turned on the shaft end 34 to produce the desired amount of axial force on the sprocket 37 and friction discs 39. When the drive motor 23 is energized, the sprockets 27, 29 and chain 33 transmit motor torque to the shaft 17, thereby causing the shaft and axles 13 to rotate and move the carriage along the rails 9. Since the friction discs rotate with the shaft but the sprocket 37 does not rotate, a friction force is produced between the mating faces of the sprocket and friction discs which tends to retard the movement of the carriage. Consequently, a portion of the motor power is expended in overcoming the friction of the anti-roll brake 35. It has been found that the optimum setting of the anti-roll brake occurs when about 25% of the motor power is expended for overcoming the friction between the friction discs and the sprocket.

Because the sprocket 37 and friction discs 39 are in constant engagement, the carriage 5 does not roll when the motor 23 is de-energized. Accordingly, even with out-of-level rails 9 the carriage is held safely immovable from the instant the motor is de-energized. The anti-roll brake continues to hold the carriage stationary until the motor is re-energized for controllably moving the carriage to a new location.

Thus, it is apparent that there has been provided, in accordance with the invention, an anti-roll safety brake which fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. In combination with a mobile storage system having at least one movable storage carriage having a frame; rails embedded in a building floor; at least one first axle journaled in the frame; a plurality of wheels mounted to the first axle for moving the carriage along the rails; and drive means for transmitting power from a power source to move the carriage along the rails, the improvement comprising:
   a. a second axle journaled for rotation in the frame;
   b. at least two wheels mounted to the second axle for supporting the second axle on the rails;
   c. shaft means coupled to the second axle for rotating in conjuntion with the second axle;
   d. a pair of friction discs mounted on the shaft means for rotation therewith;
   e. plate means interposed between the friction discs and stationarily fastened to the frame and having opposed faces for mating with the friction discs; and
   f. adjustment means for producing a predetermined force between mating faces of the friction discs and the plate means,
   so that a friction force is produced at the faces between the rotating friction discs and the stationary plate means when the shaft means tends to rotate and a portion of the power applied to move the carriage is expended to overcome the friction force between the friction discs and plate means while the carriage is moving and the friction force between the friction discs and plate means prevents unpowered rolling of the carriage at all times the power is not applied.

2. The improved combination of claim 1 wherein the plate means comprises:
   a. a plate adapted to fit over the shaft means; and
   b. link means for restraining the plate from rotating with the shaft means.

3. The improved combination of claim 2 wherein:
   a. the plate is formed as a sprocket; and
   b. the link means is a chain wrapped around the sprocket and anchored to the frame,
   so that the chain prevents the sprocket from rotating with the shaft means.

4. The improved combination of claim 3 wherein the chain has two ends, and wherein at least one chain end is adjustably anchored to the frame.

* * * * *